United States Patent
Seon

(10) Patent No.: US 12,230,838 B2
(45) Date of Patent: Feb. 18, 2025

(54) BATTERY MODULE USING NON-WELDING TYPE STRUCTURE AS CONNECTION STRUCTURE OF BUS BAR AND VOLTAGE SENSING MEMBER

(71) Applicant: LG Energy Solution, Ltd., Seoul (KR)

(72) Inventor: Sang-Ok Seon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 664 days.

(21) Appl. No.: 17/600,262

(22) PCT Filed: Nov. 24, 2020

(86) PCT No.: PCT/KR2020/016730
§ 371 (c)(1),
(2) Date: Sep. 30, 2021

(87) PCT Pub. No.: WO2021/256631
PCT Pub. Date: Dec. 23, 2021

(65) Prior Publication Data
US 2022/0255193 A1    Aug. 11, 2022

(30) Foreign Application Priority Data
Jun. 17, 2020    (KR) .................. 10-2020-0073794

(51) Int. Cl.
*H01M 10/48*    (2006.01)
*H01M 50/507*   (2021.01)
(Continued)

(52) U.S. Cl.
CPC ......... *H01M 50/507* (2021.01); *H01M 10/48* (2013.01); *H01M 50/519* (2021.01); *H01M 50/552* (2021.01)

(58) Field of Classification Search
CPC .. H01M 50/507; H01M 10/48; H01M 50/519; H01M 50/552; H01M 50/503;
(Continued)

(56) References Cited

U.S. PATENT DOCUMENTS

| 2011/0163569 A1 | 7/2011 | Yoneyama et al. |
| 2012/0115015 A1 | 5/2012 | Park et al. |

(Continued)

FOREIGN PATENT DOCUMENTS

| CN | 103296321 A | 9/2013 |
| CN | 105702904 A | 6/2016 |

(Continued)

OTHER PUBLICATIONS

International Search Report for Application No. PCT/KR2020/016730 mailed Mar. 15, 2021, pp. 1-3.

*Primary Examiner* — Cynthia K Walls
(74) *Attorney, Agent, or Firm* — Lerner David LLP

(57) ABSTRACT

A battery module including battery cells connected in series or connected in series and in parallel, a plurality of bus bars connected to corresponding electrode leads of the battery cells and respectively having a keyway recessed from a surface thereof, and a voltage sensing member having sensing parts respectively connected to the bus bars. The sensing part includes a terminal portion provided in a shape corresponding to the keyway, and a bonding portion interposed in the keyway to connect the terminal portion to the keyway.

10 Claims, 7 Drawing Sheets

(51) Int. Cl.
*H01M 50/519* (2021.01)
*H01M 50/552* (2021.01)

(58) Field of Classification Search
CPC .. H01M 50/51; H01M 50/553; H01M 50/569; H01M 50/209; H01M 10/42; H01M 50/50; H01M 50/502; H01M 10/425; Y02E 60/10; C09J 2203/33
See application file for complete search history.

(56) References Cited

U.S. PATENT DOCUMENTS

| | | | |
|---|---|---|---|
| 2013/0224564 A1 | 8/2013 | Kim | |
| 2015/0064524 A1 | 3/2015 | Noh et al. | |
| 2015/0171402 A1* | 6/2015 | Gonzales | H01M 10/482 |
| | | | 429/158 |
| 2015/0372354 A1* | 12/2015 | Nakano | H01M 50/507 |
| | | | 429/90 |
| 2016/0172647 A1* | 6/2016 | Okiga | H01M 50/507 |
| | | | 429/7 |
| 2016/0294023 A1* | 10/2016 | Aoki | H01M 50/505 |
| 2018/0131047 A1 | 5/2018 | Zhao et al. | |
| 2018/0219309 A1 | 8/2018 | Okazaki et al. | |
| 2019/0198952 A1 | 6/2019 | Choi et al. | |
| 2019/0348720 A1 | 11/2019 | Oh et al. | |
| 2020/0058918 A1 | 2/2020 | Shin et al. | |
| 2021/0194101 A1 | 6/2021 | Kim et al. | |
| 2021/0384592 A1 | 12/2021 | Urano et al. | |

FOREIGN PATENT DOCUMENTS

| | | | |
|---|---|---|---|
| CN | 207474563 U | 6/2018 | |
| CN | 110114905 A | 8/2019 | |
| CN | 111279515 A | 6/2020 | |
| JP | 2001327043 A | 11/2001 | |
| JP | 2009105036 A | 5/2009 | |
| JP | 201284319 A | 4/2012 | |
| JP | 2018125158 A | 8/2018 | |
| JP | 2019534540 A | 11/2019 | |
| JP | 2020514976 A | 5/2020 | |
| KR | 20070006071 A | 1/2007 | |
| KR | 101201748 B1 | 11/2012 | |
| KR | 101288126 B1 | 7/2013 | |
| KR | 20130097046 A | 9/2013 | |
| KR | 101720614 B1 | 3/2017 | |
| KR | 20180076145 A | 7/2018 | |
| KR | 20180077695 A | 7/2018 | |
| KR | 20180113814 A | 10/2018 | |
| KR | 20190061378 A | 6/2019 | |
| KR | 20190078521 A | 7/2019 | |
| KR | 20190124022 A | 11/2019 | |
| KR | 20200030225 A | 3/2020 | |
| WO | 2018159928 A1 | 9/2018 | |
| WO | 2020090492 A1 | 5/2020 | |

* cited by examiner (a)　　　　　　(b)　　　　　　(c)

BATTERY MODULE USING NON-WELDING TYPE STRUCTURE AS CONNECTION STRUCTURE OF BUS BAR AND VOLTAGE SENSING MEMBER

CROSS-REFERENCE TO RELATED APPLICATIONS

The present application is a national phase entry under 35 U.S.C. § 371 of International Application No. PCT/KR2020/016730 filed Nov. 24, 2020, published in Korean, which claims priority from Korean Patent Application No. 10-2020-0073794 filed Jun. 17, 2020, all of which are incorporated herein by reference.

TECHNICAL FIELD

The present disclosure relates to a battery module, and more particularly, to a battery module in which a connection structure between a bus bar and a voltage sensing member, required for sensing voltage of battery cells in the battery module, is improved into a non-welding type.

The present application claims priority to Korean Patent Application No. 10-2020-0073794 filed on Jun. 17, 2020 in the Republic of Korea, the disclosures of which are incorporated herein by reference.

BACKGROUND

A semi-permanent battery that converts electrical energy into chemical energy and may repeat charging and discharging is called a secondary battery, to be distinguished from a primary battery that cannot be reused after being used once.

The secondary battery include lithium secondary batteries, nickel cadmium (Ni—Cd) batteries, lead storage batteries, nickel hydrogen (Ni-MH) batteries, zinc air batteries, alkaline manganese batteries, and the like. Among them, lead storage batteries and lithium secondary batteries are the most actively commercialized secondary batteries.

In particular, the lithium secondary batteries are actively used as electric vehicle batteries since they have high energy storage density, light weight and compact size and have advantages such as excellent safety, low discharge rate and long life. For reference, the lithium secondary batteries are generally classified into cylindrical, rectangular and pouch types depending on their manufactured shapes and are also used for energy storage system (ESS) batteries and other electric devices as well as electric vehicle batteries.

Currently, it is impossible to obtain enough power to drive an electric vehicle by using just one lithium secondary battery (cell). In order to apply a secondary battery as an energy source of an electric vehicle, a battery module in which a plurality of lithium ion battery cells are connected in series and/or in parallel must be configured, and also a battery pack including, a BMS (Battery Management System), a cooling system, a BDU (Battery Disconnection Unit) and a harness wire for connecting and functionally maintaining such battery modules generally in series is configured.

Meanwhile, as shown in FIG. 1, a battery module provided with pouch-type secondary battery cells includes bus bars 3 located at a front surface or at front and rear surfaces of the battery module. If electrode leads (not shown) are welded (W) to the bus bars in a predetermined pattern, the secondary battery cells are connected in series and in parallel. In addition, the voltage information of the secondary battery cells in the battery module is transmitted to the BMS through a voltage sensing member 5 connected to each bus bar, and the BMS monitors and controls the state of each secondary battery cell based on the voltage information. At this time, the voltage sensing member 5 employs a harness wire, a FFC (Flat Flexible Cable), a FPCB (Flexible Printed Circuit Board), or the like.

In the battery module according to the prior art, the bus bar 3 and the voltage sensing member 5 are connected by laser welding (W). However, the laser welding (W) is expensive and is difficult to control quality since there is a deviation in quality depending on the skill of a worker. Accordingly, there is a need for a technique capable of connecting the bus bar and the voltage sensing member in a non-welding type while securing a connection strength over a certain level.

SUMMARY

Technical Problem

The present disclosure is designed to solve the problems of the related art, and therefore the present disclosure is directed to providing a battery module, which allows a bus bar and a voltage sensing member to be electrically connected easily and simply in a non-welding type.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: battery cells connected in series or connected in series and in parallel; a plurality of bus bars connected to corresponding electrode leads of the battery cells and respectively having a keyway recessed from a surface thereof; and a voltage sensing member having sensing parts respectively connected to the bus bars, wherein the sensing part includes a terminal portion provided in a shape corresponding to the keyway, and a bonding portion interposed in the keyway together with the terminal portion is further provided.

The terminal portion may be provided in a ring shape having a center cavity, and the keyway may be recessed corresponding to the ring shape of the terminal portion.

The keyway may be formed deeper than a thickness of the terminal portion, and the bonding portion may be an adhesive or an adhesion tape interposed in the keyway while covering the terminal portion.

The ring shape of the terminal portion may be any one selected from a circular shape, an oval shape and a polygonal shape.

The keyway may further include a central protrusion fitted into the center of the terminal portion, and the terminal portion may be interposed in the keyway to be caught by the central protrusion.

The central protrusion may include a protrusion top portion formed to have the same size as the center cavity of the terminal portion; and a protrusion bottom portion formed to have a smaller size than the protrusion top portion.

The terminal portion may have a thickness equal to or smaller than a thickness of the protrusion bottom portion, and the terminal portion may be interposed in the keyway to be caught by a bottom of the protrusion top portion and a side of the protrusion bottom portion.

The bus bar may be a clad metal bus bar in which copper (Cu) and aluminum (Al) are bonded.

The voltage sensing member may be made of a FFC (Flat Flexible Cable) or a FPCB (Flexible Printed Circuit Board).

In another aspect of the present disclosure, there is also provided a battery pack, comprising the battery module described above.

Advantageous Effects

According to an embodiment of the present disclosure, the bus bar and the voltage sensing member may be electrically connected in a non-welding type.

In other words, in the present disclosure, the bus bar and the voltage sensing member may be electrically connected by connecting each bus bar and each sensing part in a non-welding type where the terminal portion of each sensing part is hung in the keyway of each bus bar and then attached and fixed thereto.

According to the present disclosure, compared to the conventional welding method, even an unskilled person may easily and simply connect the bus bar and the voltage sensing member, thereby securing easy quality control.

The effects of the present disclosure are not limited to the above, and effects not mentioned herein may be clearly understood from the present specification and the accompanying drawings by those skilled in the art.

DETAILED DESCRIPTION

Figure 1:
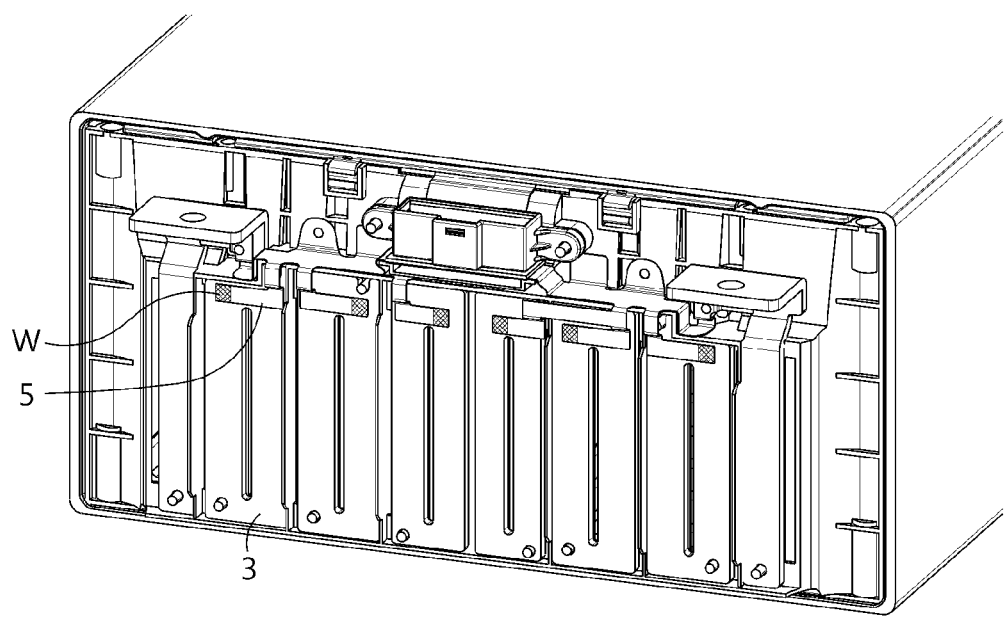
FIG. 1 is a partial perspective view showing a portion of a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
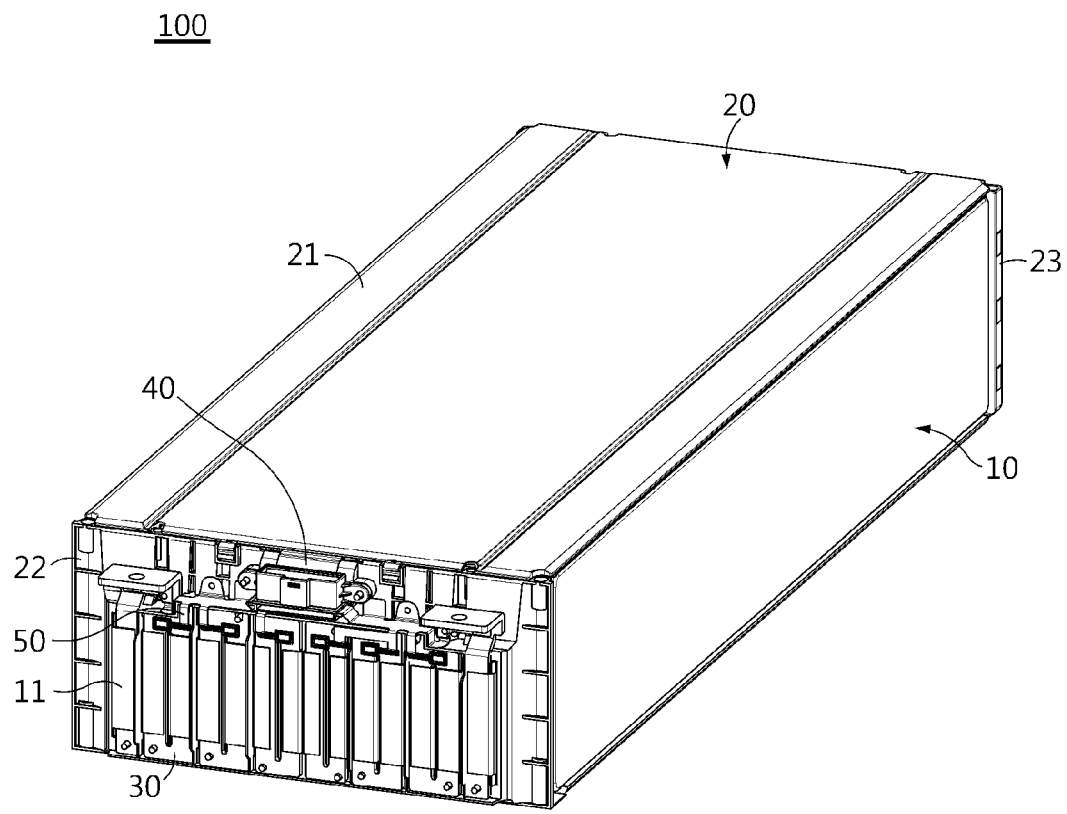
FIG. 2 is a diagram showing a main part of a battery module according to an embodiment of the present disclosure.
Figure 3:
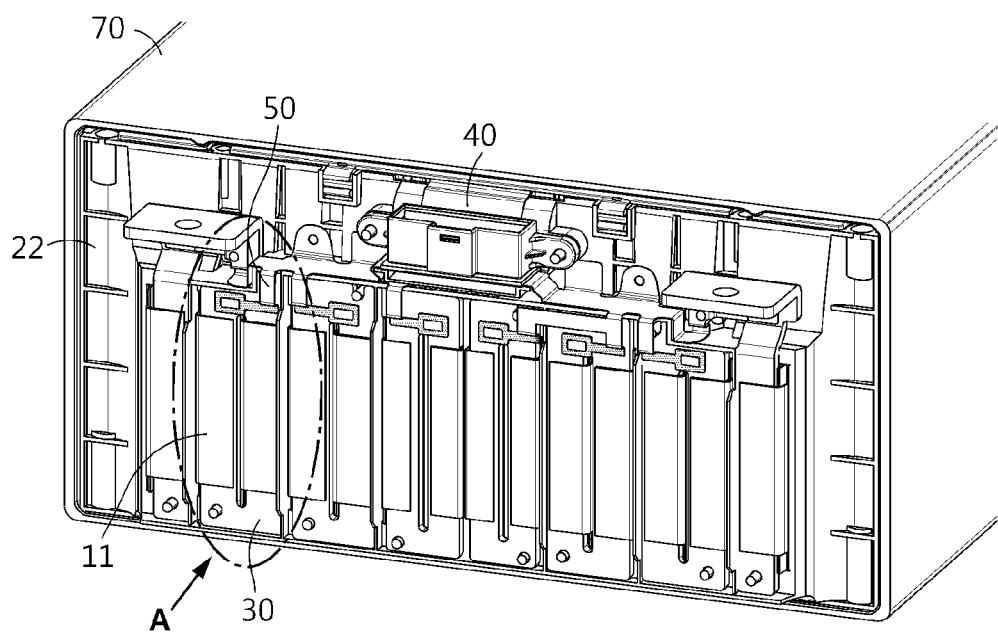
FIG. 3 is a diagram showing a front surface of the battery module of FIG. 2 to which a module case is mounted.

FIG. 2 is a diagram showing a main part of a battery module according to an embodiment of the present disclosure, and FIG. 3 is a diagram showing a front surface of the battery module of FIG. 2 to which a module case is mounted.

Referring to these figures, the battery module 100 according to an embodiment of the present disclosure includes a cell stack 10, a bus bar frame assembly 20, a plurality of bus bars 30, and a voltage sensing member 40.

The cell stack 10 may be regarded as an aggregate of battery cells. For example, the battery cells may be stacked in a left and right direction and erected in a vertical direction to form the cell stack 10. As the battery cell, a pouch-type battery cell may be applied. The battery cell of this embodiment is a two-directional lead type pouch-type battery cell in which a positive electrode lead and a negative electrode lead are located at opposite sides.

The pouch-type battery cell may include an electrode assembly, an electrolyte, and a pouch exterior for packaging them.

Each electrode plate of the electrode assembly includes an electrode tab, and at least one electrode tab may be connected to the electrode lead 11. The electrode lead 11 may be exposed from the inside of the pouch exterior to the outside to function as an electrode terminal of the battery cell.

The pouch exterior may be configured to include a metal thin film, for example an aluminum foil, in order to protect internal components such as the electrode assembly and the electrolyte, supplement the electrochemical properties by the electrode assembly and the electrolyte, and improve heat dissipation. The aluminum foil may be interposed between the insulation layer formed of an insulating material and the inner adhesive layer in order to secure electrical insulation.

The bus bar frame assembly 20 is a component that supports the cell stack 10 and forms a place to install the plurality of bus bars 30. The bus bar frame assembly 20 includes a top frame 21, a front frame 22 and a rear frame 23 and surrounds the cell stack 10. Also, the bus bar frame assembly 20 may be accommodated in a module case 70.

The top frame 21 may be provided in a plate form having an area that may cover the entire cell stack 10 from the top of the cell stack 10. A part of the voltage sensing member 40 may be placed between the top frame 21 and the cell stack 10. As the voltage sensing member 40, an FFC (Flexible Flat Cable) or a FPCB (Flexible Printed Circuit Board) may be used.

The front frame 22 and the rear frame 23 are plate-shaped bodies having areas that may cover the front and rear surfaces of the cell stack 10, respectively, and may include slits for allowing the electrode leads 11 of the battery cells to pass therethrough in a front and rear direction, a rib structure for supporting the bus bars 30 around the slits, and a short-circuit prevention barrier 22a provided between the bus bars 30.

The front frame 22 and the rear frame 23 may be provided to be hinged to both ends of the top frame 21. In this case, when the electrode leads 11 of the battery cells are fitted into the slits, since the front frame 22 or the rear frame 23 may be rotated from the outside to the inside, the electrode leads 11 may be more easily fitted into the corresponding slits.

Meanwhile, the plurality of bus bars 30 according to the present disclosure may be fixedly coupled to the front frame 22 and the rear frame 23. The battery cells may be connected in series and in parallel by welding the electrode leads 11 to the bus bars 30 in a predetermined pattern. For example, the positive electrode leads 11a of two or more battery cells are stacked, provided to pass through the slit to be pulled out to the front of the front frame 22, and then welded to one side of the bus bar 30. In addition, the negative electrode leads 11b of two or more neighboring battery cells are overlapped, provided to pass through other slits to be pulled out to the front of the front frame 22, and then welded the other side of the bus bar 30 to which the positive electrode leads 11a are attached. For the bus bar 30 located at the front of the rear frame 23, the electrode leads 11 are also welded in the same way. If the electrode leads 11 of the battery cells are welded to the bus bars 30 in this pattern, all battery cells may be connected in series and in parallel.

The battery module 100 includes a BMS (not shown, Battery Management System) for monitoring the state of the battery cells and controlling the charging and discharging of the battery cells, and a voltage sensing member 40 for sending a node voltage of the battery cells connected in series and transmitting the voltage information of each battery cell to the BMS. The voltage sensing member 40 and the BMS may be connected using a connector, a harness cable, or the like.

In this embodiment, the voltage sensing member 40 may be made of a FPCB (Flexible Printed Circuit Board). The FPCB is easy to form a fine pattern and has excellent flexibility, thereby enabling 3D wiring, so it is easy to arrange even within the battery module 100, which has a large space limitation.

The voltage sensing member 40 includes a body part (not shown) extending along a longitudinal direction of the cell stack 10 from the top of the cell stack 10, and a plurality of sensing parts 50 located at both ends of the body part (not shown) to extend in several branches.

Since the battery cells are connected in series through each bus bar 30, the voltage measured at each bus bar 30 corresponds to the node voltage of the battery cells connected in series. Accordingly, the plurality of sensing parts 50 are connected to the plurality of bus bars 30 in a one-to-one correspondence and sense voltages of the corresponding bus bars 30, respectively.

Meanwhile, in the conventional battery module 100, laser welded is used to connect each bus bar 30 and each sensing part 50. However, once welded components are practically impossible to rework or replace, and quality control is difficult because the welding quality varies according to the skill of a worker. Accordingly, the present disclosure is configured so that each bus bar 30 and each sensing part 50 may be connected in a non-welding type as described below.

Figure 4:
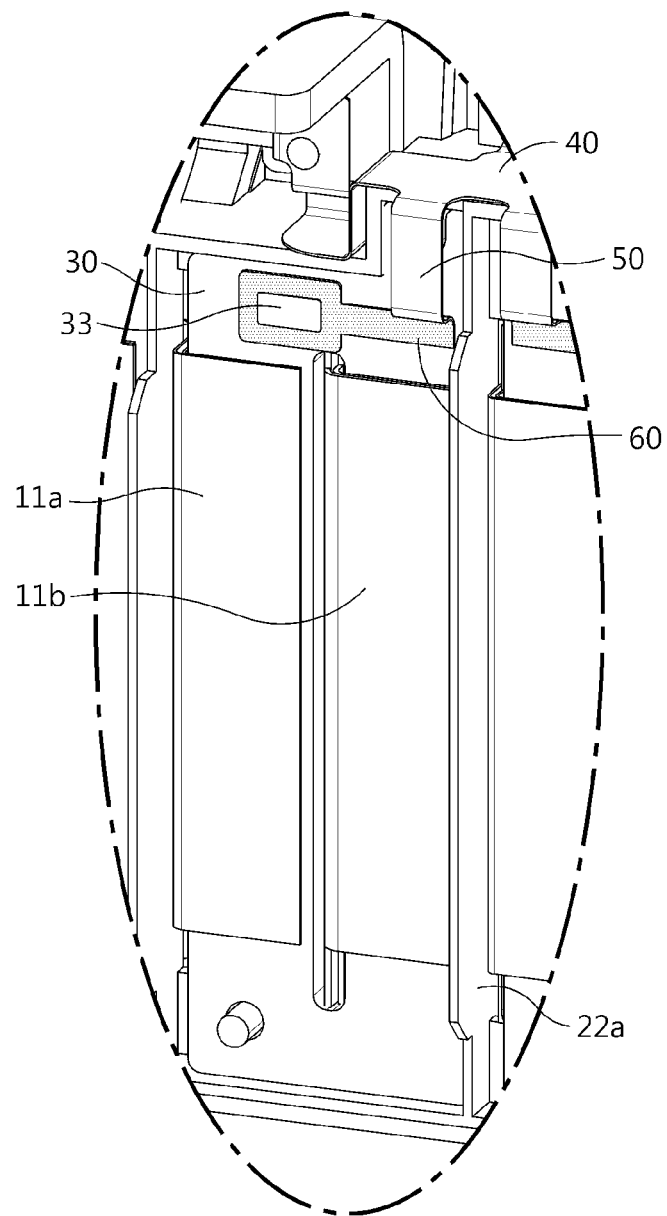
FIG. 4 is an enlarged view showing a region A of FIG. 3.
Figure 5:
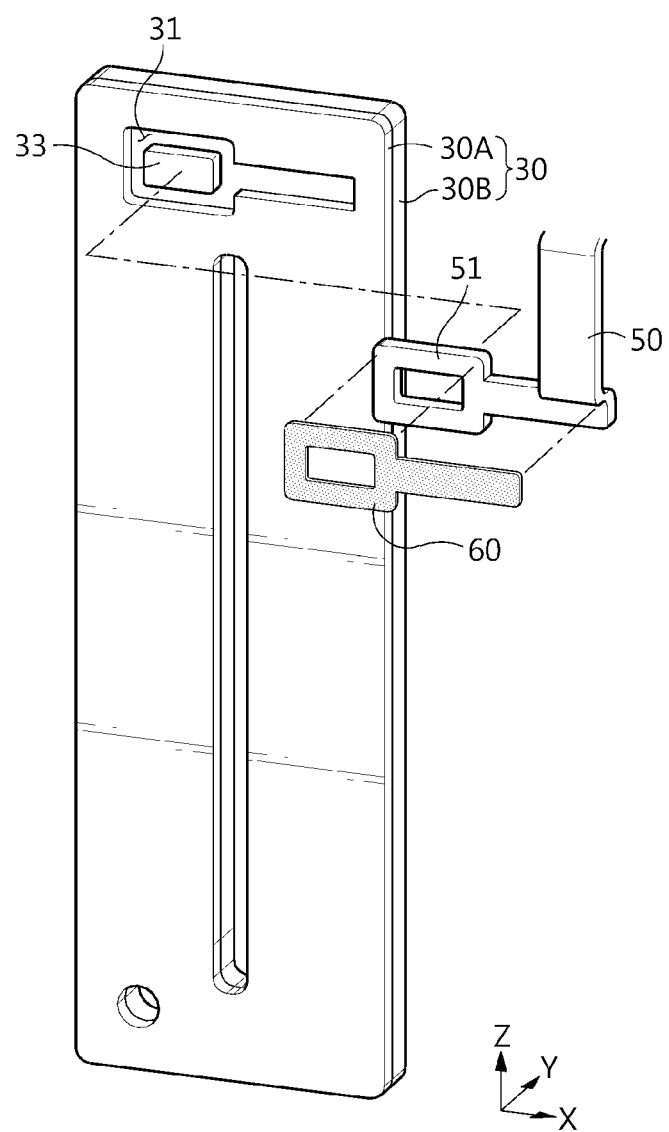
FIG. 5 is a diagram showing a bus bar and a sensing part according to an embodiment of the present disclosure.
Figure 6:
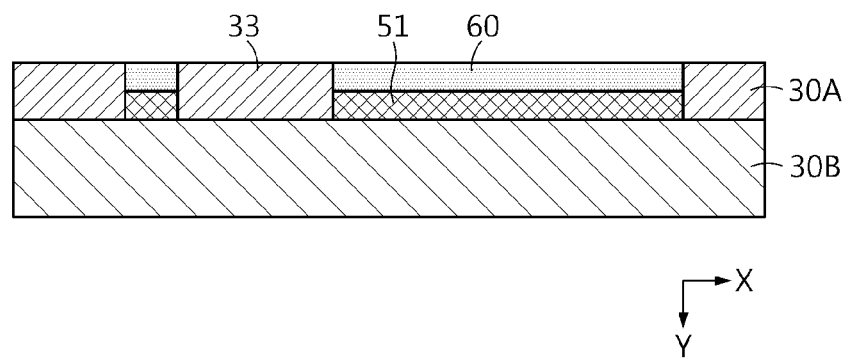
FIG. 6 is a schematic sectional view showing the bus bar and the terminal portion assembled according to an embodiment of the present disclosure.

FIG. 4 is an enlarged view showing a region A of FIG. 3, FIG. 5 is a diagram showing the bus bar 30 and the sensing part 50 according to an embodiment of the present disclosure, and FIG. 6 is a schematic sectional view showing the bus bar 30 and the terminal portion 51 assembled according to an embodiment of the present disclosure.

Referring to these figures, each of the plurality of bus bars 30 according to the present disclosure includes a keyway 31 recessed from the surface thereof, and each sensing part 50 includes a terminal portion 51 having a shape corresponding to the keyway 31. In addition, for fixing the terminal portion 51, a bonding portion 60 may be filled in the keyway 31.

The keyway 31 may be formed in the bus bar 30 at a place that is not overlapped with the electrode lead 11 to be welded. In this embodiment, as shown in FIGS. 4 and 5, the keyway 31 is formed in an upper edge region of bus bar 30 so that bus bar 30 and the sensing part 50 may be connected by a shortest distance. For example, if the sensing part 50 is designed to be arranged from the bottom of the cell stack 10 to the top, unlike this embodiment, it is preferable that the keyway 31 of bus bar 30 is formed in a lower edge area of the bus bar 30 to minimize the connection distance of the sensing part 50 and the bus bar 30.

Each sensing part 50 is a part extending in several branches from the body part of the voltage sensing member 40 and is made of a FPCB, like the body part. Therefore, each sensing part 50 includes a conductor pattern (not shown) and an outer film layer surrounding the conductor pattern. The terminal portion 51 is made of a metal piece and may be compressed onto an end of the sensing part 50 from which a part of the outer film layer is removed.

The terminal portion 51 according to this embodiment is provided in a ring shape having a center cavity, and the keyway 31 of the bus bar 30 is provided in a recessed shape corresponding to the shape of the ring-shaped terminal portion 51. In addition, the keyway 31 includes a male central protrusion 33 to be fitted into the center of the terminal portion 51.

With this configuration, the terminal portion 51 of the sensing part 50 is placed in the keyway 31 in a Y-axis direction of FIG. 5 and is caught by the central protrusion 33 to restrict the movement in X-axis and Z-axis directions.

In addition, referring to FIG. 6, the bonding portion 60 is interposed on an upper portion of the terminal portion 51 fitted into the keyway 31. The terminal portion 51 of the sensing part 50 may be interposed into and fixed to the keyway 31 together with the bonding portion 60.

The keyway 31 is formed deeper than the thickness of the terminal portion 51 to cover the upper portion of the terminal portion 51 with the bonding portion 60. A thermosetting adhesive is applied as the bonding portion 60.

The terminal portion 51 is placed in the keyway 31, and the adhesive is filled on the terminal portion 51. Therefore, the terminal portion 51 is fixed to the keyway 31 of the bus bar 30 so as not to move in all directions by the adhesive.

First, a small amount of adhesive may be applied to the keyway 31, the terminal portion 51 may be placed on the adhesive, and then the adhesive may be applied again on the upper portion of the terminal portion 51. At this time, the adhesive does not have to be applied limitedly in the keyway 31. That is, the adhesive may also be applied widely to the outer surface of the bus bar 30 around the keyway 31.

As an alternative to the thermosetting adhesive, an adhesion tape may also be used. A Teflon tape with excellent heat resistance and insulation may be used as the adhesion tape.

Figure 7:
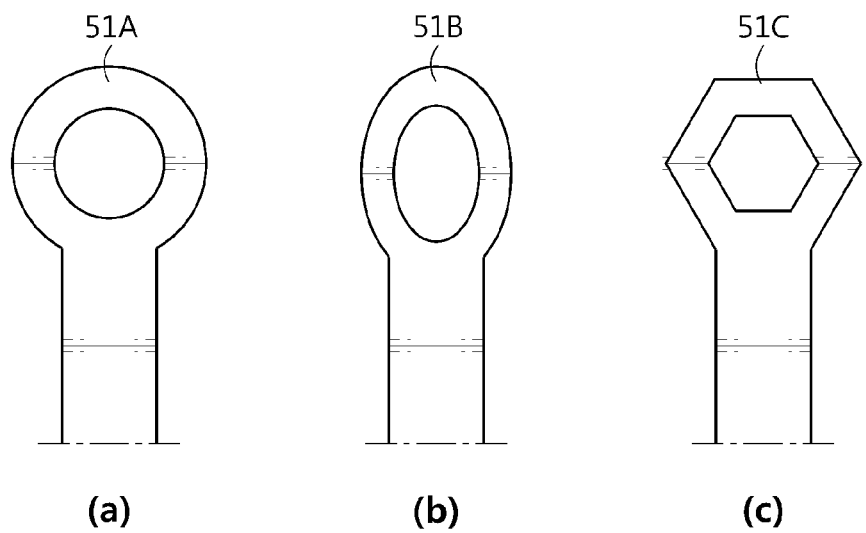
FIG. 7 is a diagram showing modified examples of the terminal portion of FIG. 5.

In this embodiment, the terminal portion 51 and the keyway 31 have a substantially rectangular ring shape, but the present disclosure is not limited to this shape. That is, as shown in FIG. 7, the terminal portion 51 may be formed in a circular ring shape 51A, an oval ring shape 51B or a hexagonal ring shape 51C, and the keyway 31 may have a recessed shape corresponding to the shape of the terminal portion 51. That is, any shape may be used as long as the terminal portion 51 is caught by the central protrusion 33 of the keyway 31.

With this configuration, the bus bar 30 and the sensing part 50 may be connected without using a large and excessive welding machine, different from the prior art. In addition, in the present disclosure, since each bus bar 30 and each sensing part 50 are connected by fitting the terminal portion 51 of the sensing part 50 into the keyway 31 formed in advance at the bus bar 30 and fixing the terminal portion 51 using an adhesive or adhesive tape, even an unskilled person may easily do the corresponding work.

Meanwhile, the bus bar 30 according to this embodiment is a clad metal bus bar 30 in which copper (Cu) and aluminum (Al) are bonded, and includes a copper layer 30A and an aluminum layer 30B. The ratio of the copper layer 30A and the aluminum layer 30B may be preferably about 2:8.

Copper has an advantage of better electrical conductivity and lower temperature rise rate than aluminum, but in the same shape, copper is about 2 times heavier than aluminum and about 3 times more expensive than aluminum. The clad metal bus bar may be regarded as neutralizing the properties of the copper bus bar and the aluminum bus bar.

In other words, the clad metal bus bar 30 has a much lighter weight than a bus bar 30 made of copper and has better electrical conductivity and lower temperature rise rate than a bus bar 30 made of aluminum. By using the clad metal bus bar 30, it is possible to reduce the weight and cost of the battery module 100. For reference, the clad metal bus bar 30 may be manufactured by hot rolling.

Next, another embodiment of the present disclosure will be described with reference to FIGS. 8 and 9. The same reference numerals as those in the former embodiment denote the same components, and the same components will not be described again, and different features from the former embodiment will be mainly described.

The battery module 100 according to another embodiment of the present disclosure is different from the battery module 100 of the former embodiment in view of the central protrusion 33 of the keyway and the catching structure of the central protrusion 33 and the terminal portion 51.

Figure 8:
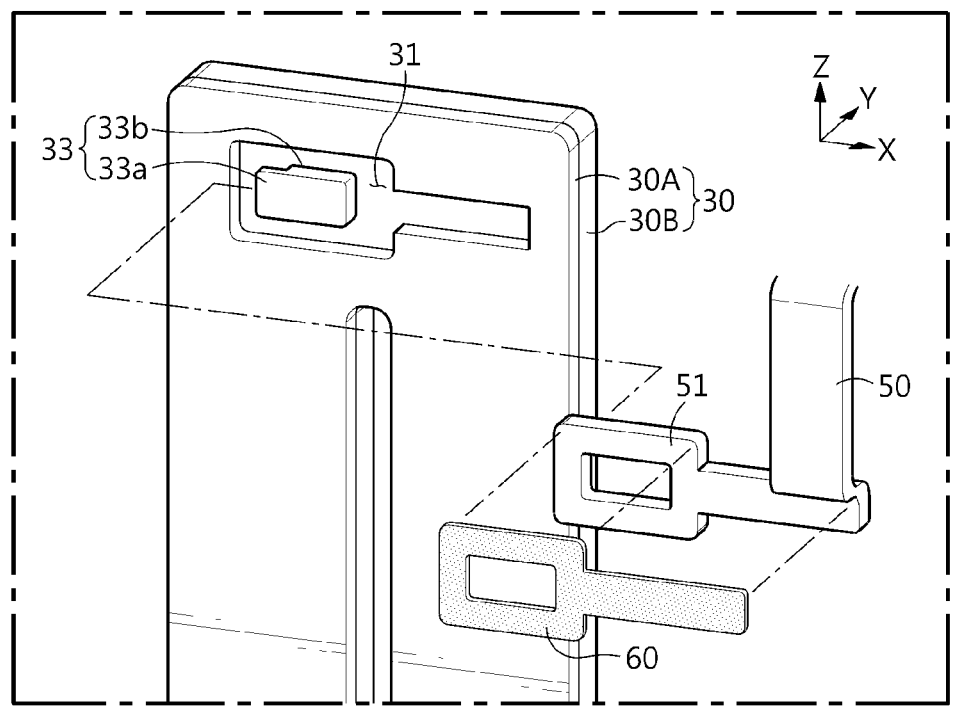
FIG. 8 is a diagram showing a bus bar and a sensing part according to another embodiment of the present disclosure.
Figure 9:
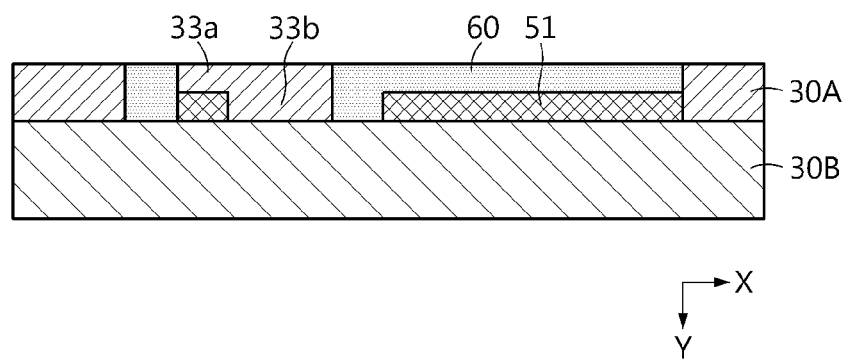
FIG. 9 is a schematic sectional view showing the bus bar and the terminal portion assembled according to another embodiment of the present disclosure.

Referring to FIGS. 8 and 9, the central protrusion 33 of this embodiment includes a protrusion top portion 33a formed to have the same size as the center cavity of the terminal portion 51, and a protrusion bottom portion 33b formed to have a smaller size than the protrusion top portion 33a. In addition, the terminal portion 51 has a thickness equal to or smaller than the thickness of the protrusion bottom portion 33b.

According to the configuration of this embodiment, the terminal portion 51 is placed in the keyway 31 in the Y-axis direction, and the central protrusion 33 is fitted into the center cavity of the terminal portion 51. In this state, the terminal portion 51 may be additionally pulled in the X-axis direction to be caught by a bottom of the protrusion top portion 33a and a side of the protrusion bottom portion 33b. In this case, since the terminal portion 51 placed in the keyway 31 does not escape out in the −Y-axis direction, the bonding portion 60 may be filled in the keyway 31 more easily.

That is, in the former embodiment, the keyway 31 is configured so that the terminal portion 51 is tightly fitted into the keyway 31 not to move in the X-axis and Z-axis directions. However, before the bonding portion 60 is interposed, the terminal portion 51 may get away from the keyway 31 in the Y-axis direction.

However, in this embodiment, the terminal portion 51 is configured to be able to move slightly in the ±X-axis direction in the keyway 31 before the bonding portion 60 is interposed, without getting away therefrom in the −Y-axis direction by the protrusion top portion 33a. Therefore, compared to the former embodiment, the catching coupling between the keyway 31 and the terminal portion 51 is more stable. In addition, as shown in FIG. 9, the adhesive forming the bonding portion 60 is filled in the keyway 31 to come into contact with even the upper portion and the side surface of the terminal portion 51. Therefore, the terminal portion 51 may be bonded and fixed better by the bonding portion 60.

Meanwhile, a battery pack according to the present disclosure may include at least one battery module 100 of the present disclosure. In addition to the battery module 100, the battery pack according to the present disclosure may further include a pack case for accommodating the battery module 100, and various devices for controlling charge and discharge of each battery module such as a master BMS, a current sensor, a fuse or the like.

The battery module 100 according to the present disclosure may be applied to a vehicle such as an electric vehicle or a hybrid electric vehicle. That is, the vehicle may include the battery module 100 according to the present disclosure.

Meanwhile, a battery pack according to the present disclosure may include at least one battery module of the present disclosure. In addition to the battery module, the battery pack according to the present disclosure may further include a pack case for accommodating the battery module, and various devices for controlling charge and discharge of each battery module such as a master BMS, a current sensor, a fuse or the like.

The battery module according to the present disclosure may be applied to a vehicle such as an electric vehicle or a hybrid electric vehicle. That is, the vehicle may include the battery module according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module, comprising:
   a plurality of battery cells connected in series or connected in series and in parallel;
   a plurality of bus bars connected to corresponding electrode leads of the battery cells, each busbar having a respective keyway, wherein the keyway is a hollowed-out space formed in the busbar, wherein the hollowed-out space is recessed from a surface of the busbar; and
   a voltage sensing member having a plurality of sensing parts, each sensing part respectively connected to a corresponding bus bar in a one-to-one correspondence and including:
      a terminal portion having a shape configured to fit inside the keyway; and
      a bonding portion configured to cover over the terminal portion so as to fix the terminal portion within the keyway.

2. The battery module according to claim 1,
   wherein the terminal portion is an annulus having a center cavity, and
   the keyway corresponds in shape to the annulus of the terminal portion.

3. A battery module, comprising:
a plurality of battery cells connected in series or connected in series and in parallel;
a plurality of bus bars connected to corresponding electrode leads of the battery cells, each busbar having a respective keyway recessed from a surface thereof; and
a voltage sensing member having a plurality of sensing parts, each sensing part respectively connected to a corresponding bus bar in a one-to-one correspondence and including:
   a terminal portion having a shape that connects to the keyway; and
   a bonding portion interposed in the keyway to connect the terminal portion to the keyway,
wherein the terminal portion is an annulus having a center cavity,
wherein the keyway includes a recess corresponding in shape to the annulus of the terminal portion,
wherein a depth of the keyway is greater than a thickness of the terminal portion, and
the bonding portion is an adhesive or an adhesion tape and covers over the terminal portion.

4. The battery module according to claim 2, wherein the annulus of the terminal portion is any one selected from a circular shape, an oval shape or a polygonal shape.

5. The battery module according to claim 2, wherein the keyway further includes a central protrusion fitted into the center cavity of the terminal portion, and the terminal portion is caught by the central protrusion when positioned within the keyway.

6. A battery module, comprising:
a plurality of battery cells connected in series or connected in series and in parallel;
a plurality of bus bars connected to corresponding electrode leads of the battery cells, each busbar having a respective keyway recessed from a surface thereof; and
a voltage sensing member having a plurality of sensing parts, each sensing part respectively connected to a corresponding bus bar in a one-to-one correspondence and including:
   a terminal portion having a shape that connects to the keyway; and
   a bonding portion interposed in the keyway to connect the terminal portion to the keyway,
wherein the terminal portion is an annulus having a center cavity,
wherein the keyway includes a recess corresponding in shape to the annulus of the terminal portion,
wherein the keyway further includes a central protrusion fitted into the center cavity of the terminal portion,
wherein the terminal portion is caught by the central protrusion when positioned within the keyway, and
wherein the central protrusion includes:
a protrusion top portion having a same size as the center cavity of the terminal portion; and
a protrusion bottom portion having a smaller size than the protrusion top portion.

7. The battery module according to claim 6,
wherein a thickness of the terminal portion is less than or equal to a thickness of the protrusion bottom portion, and
the terminal portion is caught by a bottom of the protrusion top portion and a side of the protrusion bottom portion when positioned within the keyway.

8. The battery module according to claim 1, wherein the bus bar is a clad metal bus bar in which copper (Cu) and aluminum (Al) are bonded.

9. The battery module according to claim 1, wherein the voltage sensing member is made of a FFC (Flat Flexible Cable) or a FPCB (Flexible Printed Circuit Board).

10. A battery pack, comprising the battery module according to claim 1.

* * * * *